United States Patent [19]
May et al.

[11] 3,934,541
[45] Jan. 27, 1976

[54] TRIANGULAR FOLDING REFLECTIVE TRAFFIC MARKER

[75] Inventors: Louis May, Skokie; Edmund M. Idzik, Chicago, both of Ill.

[73] Assignee: Sate-Lite Mfg. Co., Chicago, Ill.

[22] Filed: Oct. 19, 1973

[21] Appl. No.: 407,797

[52] U.S. Cl. ............................. 116/63 T; 24/224 B
[51] Int. Cl.² ........................................... E01F 9/10
[58] Field of Search ............... 116/63 P, DIG. 40; 285/DIG. 22; 403/354, 375; 24/201 S, 201 TR, 230 F

[56] References Cited
UNITED STATES PATENTS

| | | | |
|---|---|---|---|
| 1,196,769 | 9/1916 | Friedrich et al. | 24/224 B |
| 3,625,177 | 12/1971 | Miller | 116/63 P |

FOREIGN PATENTS OR APPLICATIONS

| | | | |
|---|---|---|---|
| 291,065 | 9/1953 | Switzerland | 116/63 P |
| 495,840 | 9/1950 | Belgium | 116/63 P |

Primary Examiner—James J. Gilu
Assistant Examiner—Anthony V. Ciarlante
Attorney, Agent, or Firm—Burmeister, York, Palmatier, Hamby & Jones

[57] ABSTRACT

The disclosed triangular folding reflective marker comprises a reflective base member and a pair of reflective side members which are pivotally connected to opposite ends of the base member and are swingable between folded positions, adjacent the base member, and inclined erected positions, in which the side members and the base member form an upright triangular reflective warning device, for use in warning motorists of the presence of a disabled automobile or other vehicle. Latching elements are provided to fasten the upper ends of the side members together in their erected positions. Such latching elements may comprise latching pins projecting laterally from flanges on the side members, such flanges being adapted to overlap. Portions of the flanges may be formed with latching slots adapted to receive the latching pin elements with a detent action. The side members may be formed with end elements which are adapted to project beyond the edges of the opposite side members when they are erected. By applying a squeezing force between the end elements, it is easy to disconnect the latching elements. The end elements may also cooperate with detent elements on the base member to detain the side members in their folded positions.

6 Claims, 16 Drawing Figures

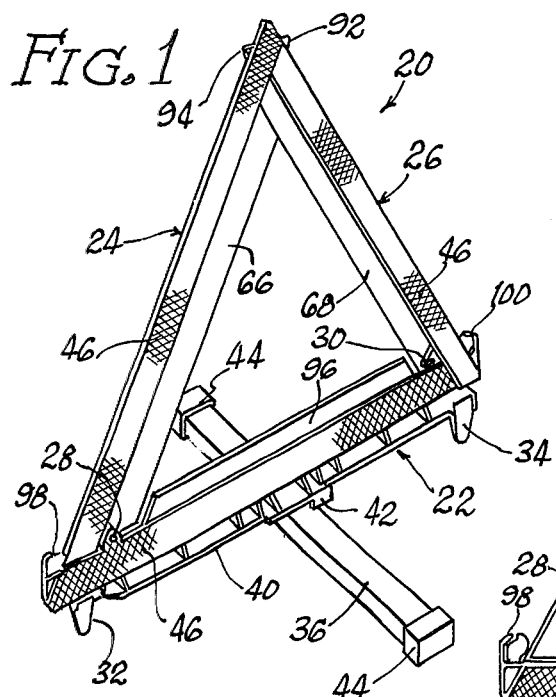
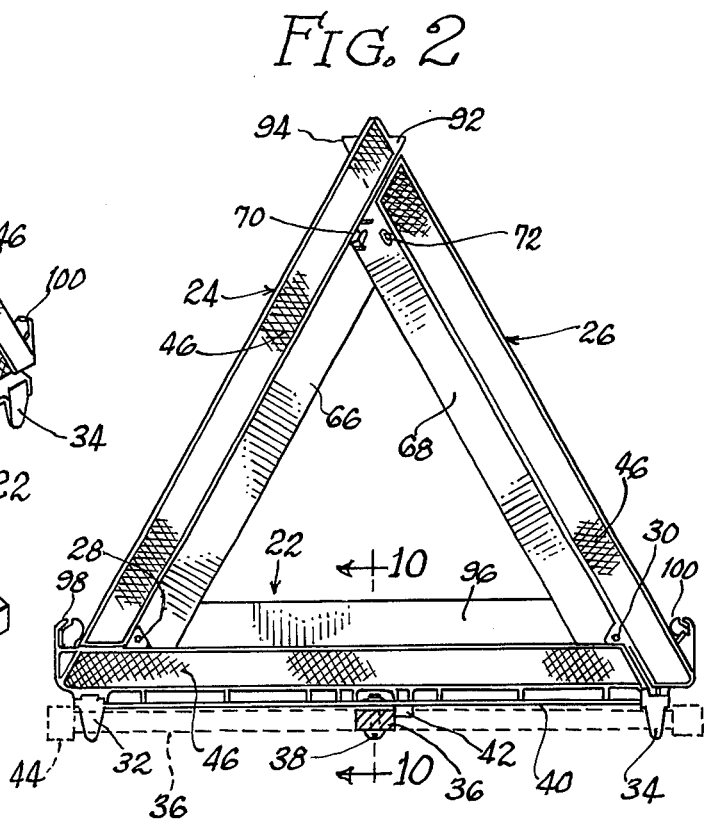
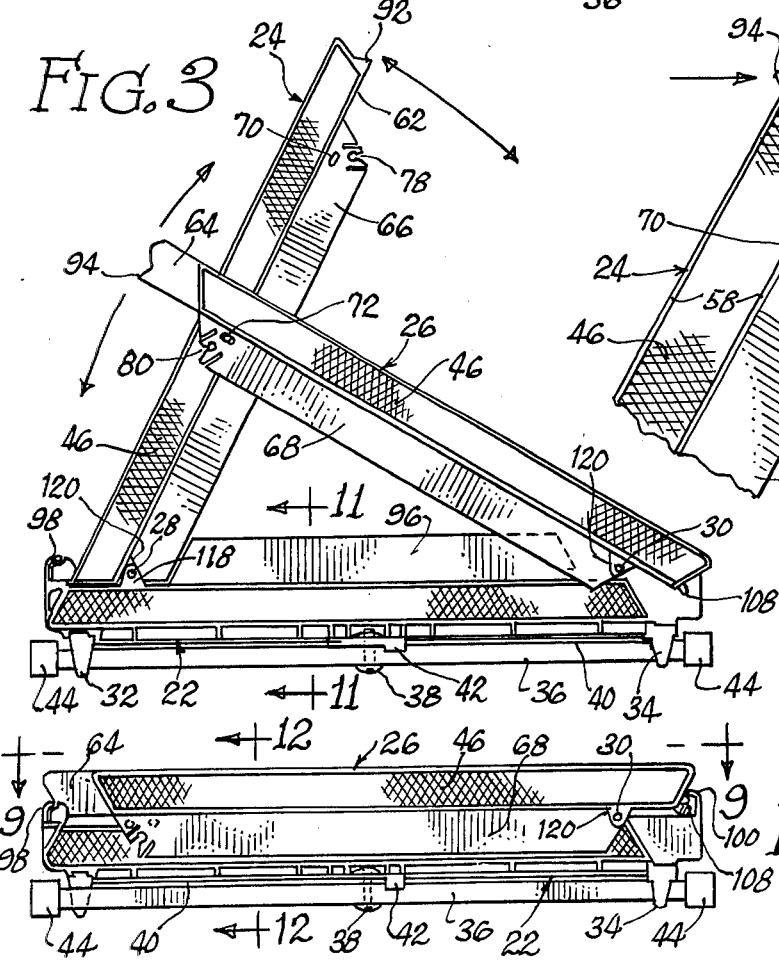
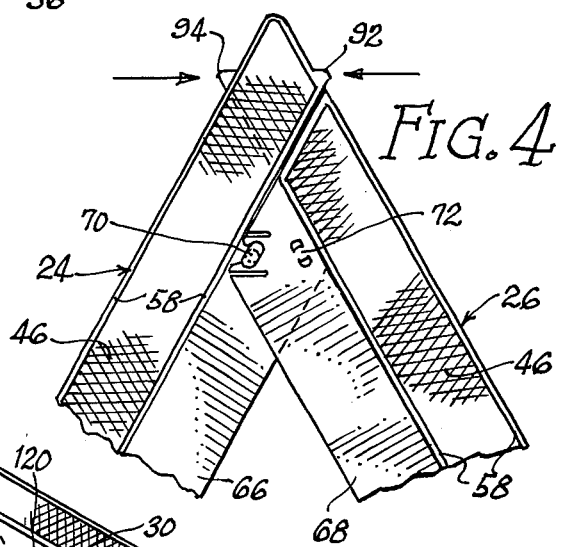
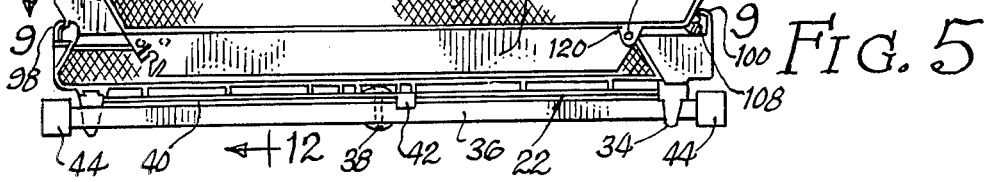

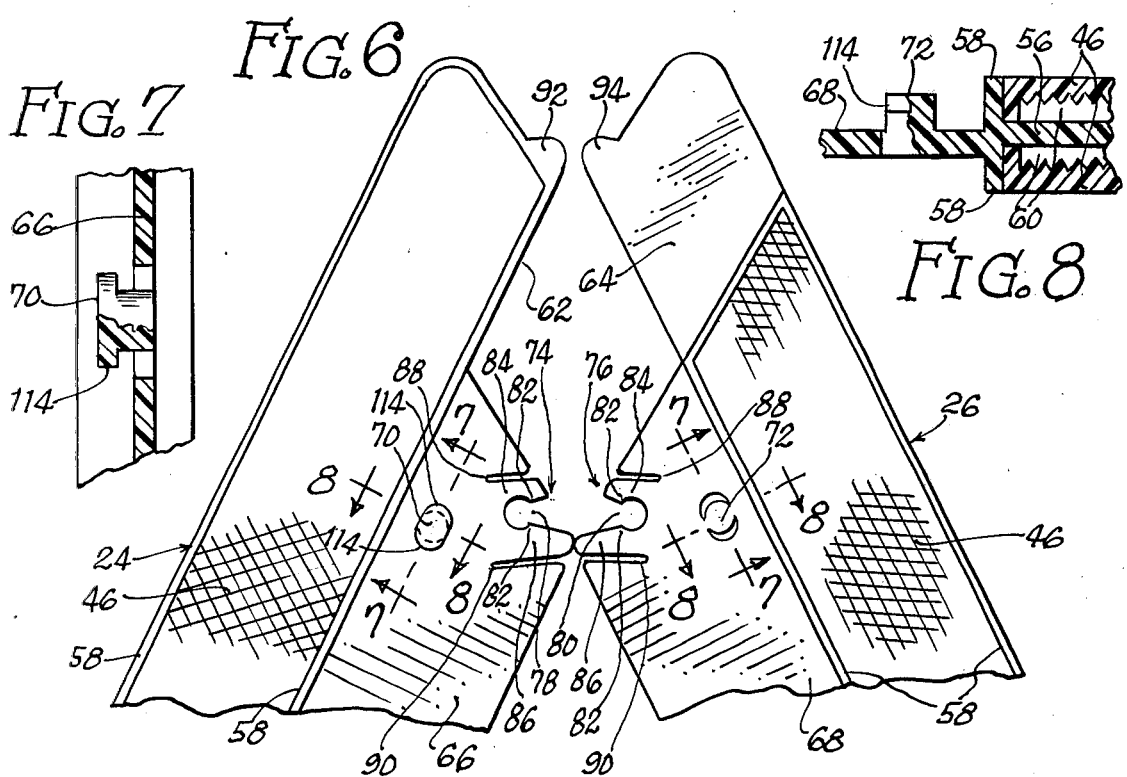
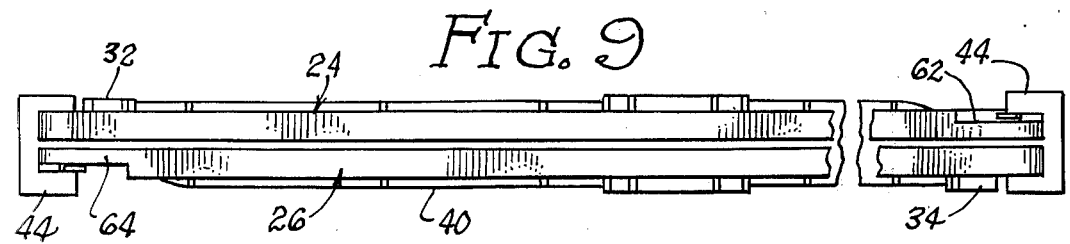
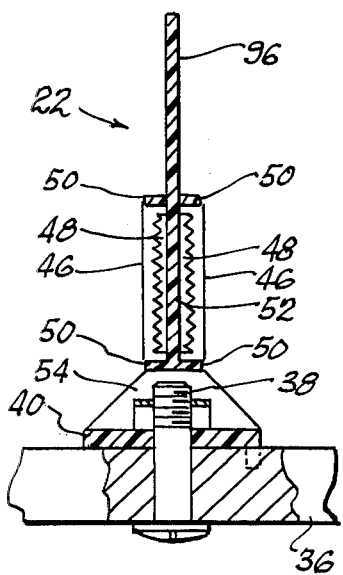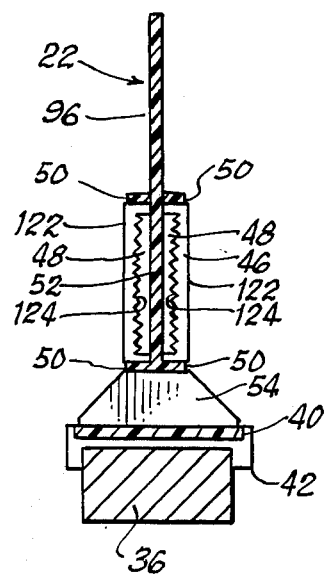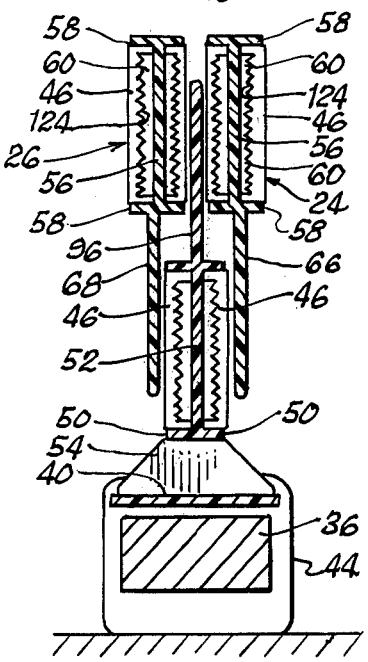

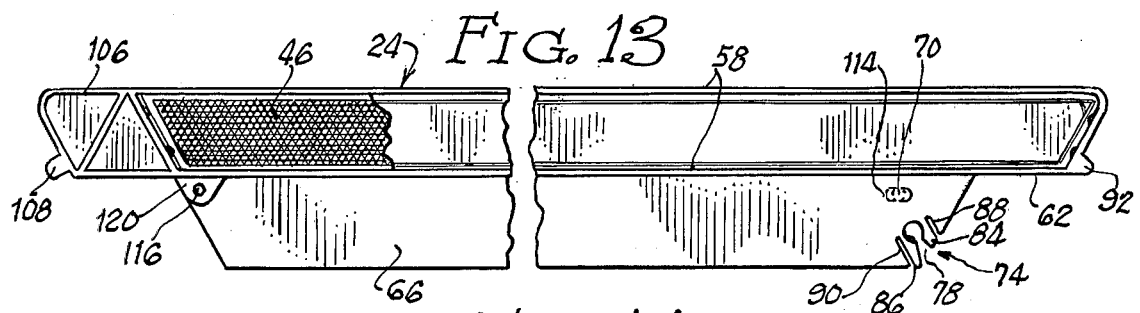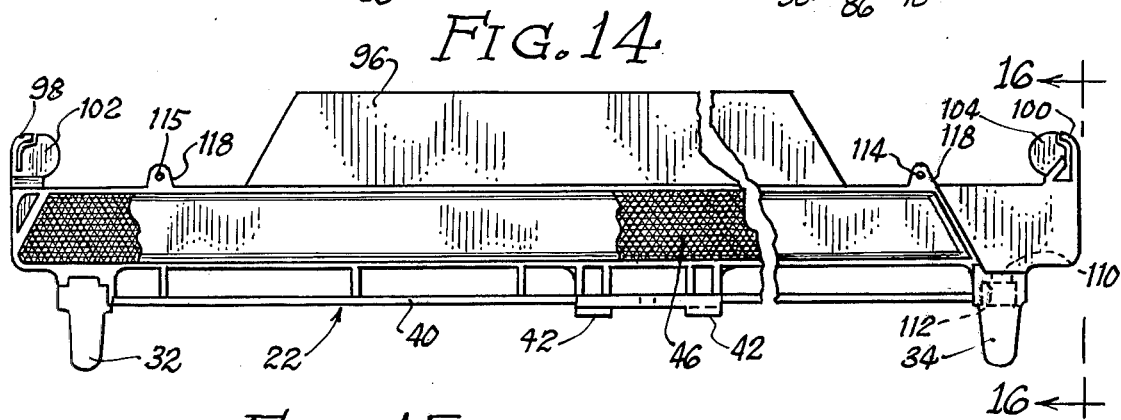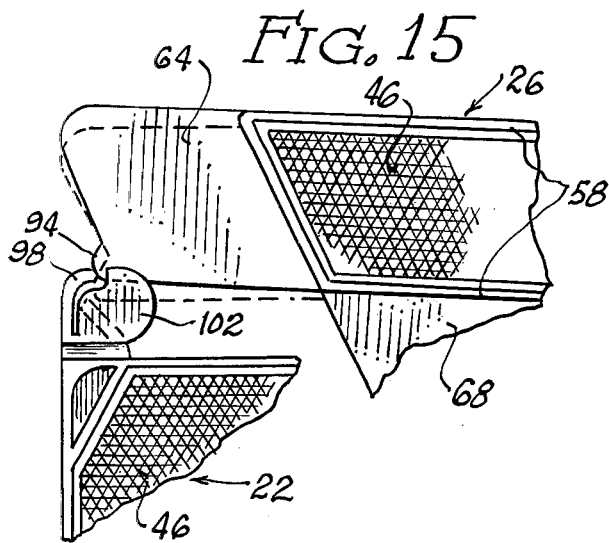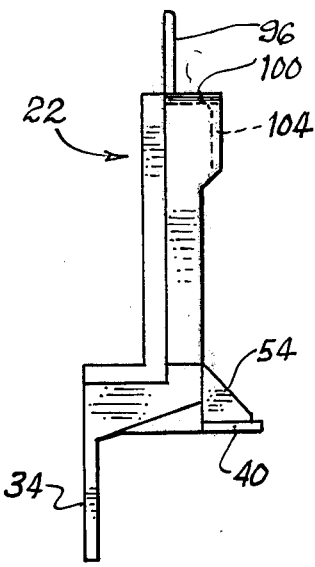

TRIANGULAR FOLDING REFLECTIVE TRAFFIC MARKER

This invention relates to a triangular folding reflective marker, sometimes referred to in the trade as a reflective flare, adapted to be used as a warning device in connection with an automobile or other vehicle, to warn approaching motorists of the presence of a disabled vehicle.

Reflective markers of this type comprise a reflective base member and two reflective side members which may be erected to form a triangle. A brace or cross member is generally employed in connection with the base member so that the reflective marker will stand upright and will not be blown over, even in a strong wind.

One object of the present invention is to provide a new and improved triangular folding reflective marker in which the folding side members are easy to erect and are provided with means for securely latching the upper ends of the side members together in their erected positions.

A further object is to provide such a new and improved marker having means whereby the upper ends of the side members may easily be unlatched or disconnected, so that the flare can be folded for future use.

Another object is to provide such a new and improved marker having detent means for retaining the side members in their folded positions for compact storage.

It is a further object to provide such a new and improved marker in which the side members have two sets of elements adapted to overlap in opposite senses.

To achieve these objects, the present invention preferably comprises a reflective base member and a pair of reflective side members which are pivotally connected to the opposite ends of the base member, so as to be swingable between folded positions adjacent the base member and inclined erected positions in which the side members and the base member form a triangle. Latching elements are provided to fasten the upper ends of the side members together in their erected positions. Such latching elements may comprise latching pins projecting laterally from flanges on the side members. Such flanges are adapted to be overlapped when the side members are erected. Portions of the flanges may be formed with slots for receiving the opposite latching pins with a detent action. Additional slots may be formed in the flanges on opposite sides of the latching slots, to provide resilient fingers adjacent the latching slots.

To facilitate the disconnection of the latching elements, the side members preferably include end elements which project beyond the opposite side members when they are erected. The latching elements may easily be disconnected by applying a squeezing force between the end elements.

Detent elements are preferably provided to detain the side members in their folded positions. Such detent elements may comprise resilient fingers or the like on the base member, adapted to engage and retain the end elements on the side members.

The side members preferably have half-lap portions adapted to overlap when the side members are in their erected positions. The overlapping of the half-lap portions is in the opposite sense to the overlapping of the flanges to produce an interlocking action.

Further objects and advantages of the present invention will appear from the following description, taken with the accompanying drawings in which:

FIG. 1 is a perspective view of a triangular folding reflective marker to be described as an illustrative embodiment of the present invention, the marker being shown in its fully erected condition.

FIG. 2 is a front elevation of the marker, with the cross member of the base shown in section.

FIG. 3 is a front elevation showing the marker with the cross member folded and one of the side members partially folded.

FIG. 4 is an enlarged fragmentary front elevation showing additional details of the latching elements on the upper ends of the side members.

FIG. 5 is a front elevation showing the marker in its fully folded condition.

FIG. 6 is a fragmentary enlarged front elevation showing the upper ends of the side members in disconnected positions.

FIG. 7 is a fragmentary section along either of the lines 7—7 in FIG. 6.

FIG. 8 is another framentary section along either of the lines 8—8 in FIG. 6.

FIG. 9 is a plan view showing the marker in its fully folded condition.

FIGS. 10, 11 and 12 are fragmentary vertical sections taken generally along the lines 10—10, 11—11 and 12—12 in FIGS. 2, 3 and 5, respectively.

FIG. 13 is a front elevation of one of the side members, shown detached from the marker.

FIG. 14 is a front elevation of the reflective base member, detached from the marker.

FIG. 15 is a fragmentary enlarged front elevation showing details of the detent elements for holding the side members in their folded positions.

FIG. 16 is an end view of the reflective base member, taken generally as indicated by the line 16—16 in FIG. 14.

As just indicated, FIGS. 1-3 illustrate a triangular folding reflective marker or flare 20 adapted to be carried in an automobile or any other vehicle in a folded condition, as shown in FIG. 5 so that the marker can be erected and placed along the roadway behind the vehicle as a warning to approaching motorists, in the event that the vehicle becomes disabled. The marker 20 reflects the lights of the approaching vehicles so that the drivers of such vehicles will see the marker as a brilliant triangle.

The illustrated marker 20 comprises a reflective base member 22 and a pair of reflective side members 24 and 26 which are pivotally connected to the opposite ends of the base member 22, so that the side members can be swung upwardly to their inclined erected positions, as shown in FIGS. 1 and 2. Pivot pins or rivets 28 and 30 may be provided between the base member 22 and the side members 24 and 26. The side members 24 and 26 are swingable downwardly to their folded positions, adjacent the base member 22, as shown in FIGS. 5, 9 and 12.

The illustrated base member 22 has downwardly projecting feet 32 and 34 near the opposite ends of the base member, for engaging the ground or some other supporting surface. To enable the flare 20 to stand erect in a strong wind, the base member 22 is preferably fitted with a heavy folding cross member 36, which may be in the form of a bar made of some heavy material, such as steel, for example.

A swivel connection is preferably provided between the base member 22 and the cross member 36 so that the cross member can be folded into a position in which it is parallel to the base member, as shown in FIGS. 3 and 5. In the illustrated construction, such swivel connection is provided by a swivel bolt 38, extending through openings in the cross member 36 and in a horizontal flange 40 of the base member 22. The swiveling movement of the cross member 36 is preferably limited by a pair of stop elements 42 projecting downwardly from the base member 22. As shown in FIGS. 3 and 5, the cross member 36 is engagable with the sides of the stop elements 42 when the cross member 36 is folded so as to extend parallel to the base member 22. The cross member 36 engages the ends of the stop elements 42 when the cross member is unfolded so as to extend at right angles to the base member 22, as shown in FIG. 1.

To prevent the marker 20 from sliding along a pavement surface, it is preferred to provide the cross member 36 with non-skid feet, which may take the form of end caps 44 made of natural or synthetic rubber, or some other similar material.

The base member 22 and the side members 24 and 26 are preferably made of some durable yet inexpensive material, such as various resinous plastic materials. The material may be brightly colored for a high degree of visability. For example, the base and side members 22, 24 and 26 may be made of a plastic material having a bright fluorescent orange color.

To provide high visibility at night, the base and side members 22, 24 and 26 are preferably fitted with reflectors 46 which may be of the many faceted prismatic lens type. Thus, the illustrated reflectors 46 are in the form of plates made of transparent material, such as a suitable resinous plastic material. The reflectors 46 may be of a red color, or some other bright color. The rear sides of the lenses 46 may be molded or otherwise formed with a multitude of prism facets which produce total internal reflection of incident light.

As shown to best advantage in FIGS. 10–12, the base member 22 is preferably provided with two of the reflective lens plates 46, mounted on opposite sides of the base member 22, in recesses 48 formed by border flange 50 projecting laterally from a vertical flange or web 52. As shown, a series of vertical ribs 54 extend between the horizontal flange 40 and the lower portions of the border flanges 50 on the base 22. The lens plates 46 are suitably fastened into the recesses 48 in the base member 22, as by means of ultrasonic welding, heat sealing, or by the use of cement.

Similarly, each of the side members 24 and 26 may have a main vertical flange 56 from which border flanges 58 project laterally to form recesses 60 for the reflective lens plates 46, which may be secured within the recesses by the means indicated above, or in any other suitable manner.

The upper end portions of the illustrated side members 24 and 26 have mating half-lap portions 62 and 64 which are adapted to overlap so as to form a half-lap joint when the side members 24 and 26 are erected and joined together, as shown in FIGS. 1, 2 and 4. In FIGS. 2, 3 and 4 the side member 24 is to the rear of the base member 22, while the side member 26 is in front of the base member. It will be evident, however, that the halp-lap portions 62 and 64 overlap in the opposite sense. Thus, the half-lap 62 is adapted to extend in front of the half-lap portion 64 when these portions are overlapped.

In addition to the half-lap portions 62 and 64, the joint between the side members 24 and 26 utilizes longitudinal flanges or fins 66 and 68 extending along the lower edges of the side members 24 and 26, respectively. These fins 66 and 68 are also adapted to overlap, as will be evident from FIGS. 1, 2 and 4. The fins 66 and 68 overlap in the opposite sense from the half-lap portions 62 and 64. Thus, the fin 68 on the side member 26 is adapted to extend in front of the fin 66 on the side member 24. A highly secure joint is formed between the side members 24 and 26 as the result of arranging the half-lap portions 62 and 64 and the fins 66 and 68 so as to overlap in opposite senses.

Latching elements are preferably provided on the side members 24 and 26 to latch them together in their erected positions. The arrangement of the latching elements is such that they hold securely yet are easy to connect and disconnect. In the illustrated construction, the latching elements comprise pin elements 70 and 72 projecting laterally from the fins or flanges 66 and 68. It will be seen that the pin element 70 projects forwardly from the fin 66, while the pin element 72 projects rearwardly from the fin 68. As will be evident from FIGS. 6, 7 and 8 the pin elements 70 and 72 may be molded in one piece with the fins or flanges 66 and 68.

In addition to the pin elements 70 and 72, the fins or flanges 66 and 68 are preferably formed with latching clip elements 74 and 76, comprising slots 78 and 80 which are adapted to receive the pin elements 72 and 70 on the opposite side members. The slots 78 and 80 are preferably shaped to provide a detent action with the pin elements 70 and 72 so that the pin elements will be detained in the slots. In the illustrated construction, such detent action is obtained by providing a pair of detent elements 82 projecting from the opposite edges of each slot.

To make it easier to move the pin elements 70 and 72 into the slots 80 and 78, it is preferred to provide resilient fingers 84 and 86 on opposite sides of both slots. The fingers 84 and 86 may be molded in one piece with the fins 66 and 68. The compliance of the fingers 84 and 86 is increased by providing additional slots 88 and 90 in the fins 66 and 68 on the opposite sides of the latching slots 78 and 80.

The latching joint between the side members 24 and 26 can be assembled very easily by overlapping the fins 66 and 68 and pushing the side members together so that the pin element 70 enters the latching slot 80, while the pin element 72 enters the latching slot 78. The side members 24 and 26 are shown in a preliminary stage of assembly in FIG. 6, while being shown fully assembled in FIGS. 1, 2 and 4.

The disconnection of the latching joint between the side members 24 and 26 may be facilitated by providing end elements or tabs 92 and 94 which project from the ends of the side members 24 and 26 and are adapted to extend beyond the opposite side members, as will be evident from FIGS. 1, 2 and 4. The latching joint between the side members 24 and 26 can easily be disconnected by applying a squeezing force between the end elements 92 and 94, as indicated by the arrows in FIG. 4. The squeezing force causes the side members 24 and 26 to swing apart, so that the pin elements 70 and 72 are withdrawn from the latching slots 80 and 78.

It will be seen from FIG. 12 that the fins or flanges 66 and 68 on the side members 24 and 26 are off-center, to facilitate the overlapping of the fins. Thus, the fin 66 is offset rearwardly from the center of the side member 24, while the fin 68 is offset forwardly from the center of the side member 26.

On the other hand, the base member 22 has an upwardly projecting vertical fin or flange 96 which is centered, relative to the flange or web 52. The fin 96 extends between the side members 24 and 26 when they are folded, as shown in FIG. 12.

The flare 20 is preferably provided with detent elements for detaining the side members 24 and 26 in their folded positions. The detent elements are provided on the base member 22, and also on the side members 24 and 26. In this case, the end elements or tabs 92 and 94 are utilized as the detent elements on the side members 24 and 26. Resilient elements are provided on the base member 22 to engage the tab elements 92 and 94 with a latching or detaining action. As shown to best advantage in FIGS. 5, 14 and 15, such resilient elements may take the form of resilient fingers 98 and 100, extending upwardly from the opposite ends of the base member 22. The fingers 98 and 100 are preferably molded in one piece with the base member 22, which may be made of a suitable resinous plastic material, as previously indicated.

FIG. 15 shows the manner in which the tab or projection 94 on the end of the side member 26 is engagable with the detent finger 98. The tab 94 displaces the resilient finger 98 with a camming action and then snaps past the fingers so that it will latch or detain the tab 94. A flange or retainer 102 is preferably provided on the base member 22 near the detent finger 98, to prevent the side member 26 from escaping laterally from the detent finger 98. A similar flange or retainer 104 is provided near the flexible detent finger 100 to prevent the tab 92 from escaping laterally from the detent finger.

The detent fingers 98 and 100 detain the tabs 92 and 94 with sufficient strength to keep the side members 24 and 26 folded against accidental opening movement. However, it is easy to overcome the detaining action of the fingers 98 and 100 when it is desired to erect the side members 24 and 26.

The marker 20 has the ability to stand upright with a high degree of stability, even when the flare is subjected to strong winds. The heavy cross member 36 and the feet 32 and 34 on the base member 22 prevent the flare 20 from tipping over. The rubber or rubber-like feet 44 on the cross member 36 prevent the marker from slipping along a pavement surface, or any other supporting surface. The side members 24 and 26, in conjunction with the base member 22, provide a high degree of rigidity, so that the side members will not be flexed or displaced laterally to any objectionable extent by strong winds. The rigidity of the side members 24 and 26 is enhanced considerably by the border flanges 58 and the reflective lens plates 46.

In addition, the base member 22 and the side members 24 and 26 have interlocking elements which minimize the flexure of the base member and the side members in the portions thereof which are adjacent the pivot pins or rivets 28 and 32. Thus, each side member has a tail portion 106 which is formed with a projection or tab 108, adapted to interlock with an opening 110 in the base member 22. There are two such openings 110 near the opposite ends of the base member 22. The openings are formed in horizontal flange elements 112. The fit between the projections 108 and the openings 110 is sufficiently close to prevent any substantial lateral deflection of the tail portions 106 when the side members 24 and 26 are erected.

When the side members 24 and 26 are closed or folded, so as to extend alongside the base member 22, the projections 106 are withdrawn from the openings 110. When the side members 24 and 26 are swung upwardly to erect the marker 20, the projections 108 enter the openings 110 so as to prevent lateral displacement of the tail portions 106.

The upper ends of the side members 24 and 26 may be joined together by overlapping the half-lap portions 62 and 64, while simultaneously overlapping the fins 66 and 68 in the opposite sense. The latching pin elements 70 and 72 are moved into the slot elements 80 and 78. By virtue of the detent projections 82, the pin elements are detained in the slot elements against accidental disconnection. Lateral movement of the pin elements 70 and 72 out of the slot elements 80 and 78 is prevented by enlarged heads or flanges 114 on both of the pin elements 70 and 72.

The side members 24 and 26 can easily be folded by squeezing the tabs 92 and 94 so as to swing the side members away from each other. In this way, the pin elements 70 and 72 are withdrawn from the latching slots 80 and 78, as shown in FIG. 6. The side members 24 and 26 can then be folded downwardly so that they are parallel to the base member 22. The side members 24 and 26 are detained in their folded positions by the engagement of the projecting tabs 92 and 94 with the flexible detent fingers 98 and 100 at the opposite ends of the base member 22. The folding of the marker 20 can be completed by swiveling the cross member 36 into its folded position, parallel with the base member 22.

It will be seen from FIGS. 5, 9 and 12 that the illustrated marker 20 folds very compactly. The thickness of the folded marker is only slightly greater than the combined thicknesses of the side members 24 and 26. When the marker is folded, the reflective lens plates 46 on the side members 24 and 26 are disposed on opposite sides of the relatively thin fin or flange 96 on the base member 22, so that the thickness of the folding flare at this point corresponds to the combined thicknesses of the side members 24 and 26, plus the relatively small thickness of the fin 96 and the minimal working clearances between the fin 96 and the side members 24 and 26.

It should be noted that the illustrated marker 20 is symmetrical in construction so that the opposite sides of the flare are identical in appearance. Moreover, the latching joint between the upper end portions of the side members 24 and 26 is mechanically symmetrical so that the joint may be connected and disconnected from either side of the flare with equal facility. One of the latching pin elements 70 and 72 projects toward one side of the marker, while the other projects toward the opposite side. It is equally easy to move the pin elements 70 and 72 into the latching slots 80 and 78 from either side of the marker. Thus, it is particularly easy to erect the marker under emergency conditions when the user of the marker may be hurried and hampered by darkness. The symmetrically disposed pin elements 70 and 72, when latched in the slots 80 and 78, provided two points of connection between the upper ends of the side members 24 and 26, so that the rigidity of the latched joint is greatly increased.

Existing government specifications for triangular reflective markers require that the marker be able to withstand a wind of 40 miles per hour without tipping over or sliding, and without deflecting more than 10° from the vertical. The illustrated marker easily meets and exceeds these requirements. The heavy cross member 36, with its rubber feet 44, provides sufficient weight to prevent the marker from tipping over or sliding along any supporting surface. The joints between the reflective base member 22 and the side members 24 and 26 are sufficiently rigid to minimize the deflection of the marker under high wind conditions, so that the governmental standard is easily met. Each joint provides two points of interlocking engagement between the members. Thus, the pivot pins or rivets 28 and 30 provide one point of engagement for each joint. The projections or tabs 108 interlock with the openings 110 to provide a second point of interlocking engagement for each joint. It will be seen that the illustrated rivets 28 and 30 extend through openings 115 and 116 formed in reinforcing bosses 118 and 120. Two of the bosses 118 are formed on the base member 22 near the opposite ends thereof, while one of the bosses 120 is formed on each of the side members 24 and 26. The rivets 28 and 30 are sufficiently long to extend through the bosses 118 and 120. The long rivets provide exceptionally rigid joints between the base member 22 and the side members 24 and 26.

The governmental specifications for such marker also require that the reflective lens plates 46 be moisture proof. The illustrated marker 20 easily meets this requirement. It will be seen from FIGS. 10-12 that each lens plate 46 has a smooth outer surface 122 which is exposed to the weather and is not affected by moisture. Each lens plate 46 has a rear surface with a multitude of cube corner facets 124 to provide the desired reflex action, in that the light which is incident upon the front surface 122 is reflected internally by the cube corner facets 124.

It will be recalled that the lens plates 46 on the base member 22 are mounted in the recesses 48 formed by the border flanges 50 projecting from the vertical flare 52. Similarly, the lens plates 46 on the side members 24 and 26 are mounted in the recesses 60 formed by the border flanges 58 on the vertical flanges 56. The lens plates 46 are sealed to the members 22, 24 and 26 by ultrasonic welding, heat sealing, or cement. Ultrasonic welding provides an exceptionally effective seal against the entry of moisture, so that the lens plates 46 will be fully moisture proof. Thus, moisture will be excluded from the cube corner facets 124 of the lens plates. It will be impossible for moisture to affect the ability of the reflex lens plates 46 to reflect light.

We claim:

1. A triangular folding reflective marker, comprising a reflective base member, and first and second reflective side members having pivotal connections to opposite ends of said base member, said side members being swingable from horizontal folded positions adjacent said base member to inclined erected positions to form the sides of a triangle, said side members having upper end portions with longitudinal flanges adapted to overlap when said side members are in their erected positions, each of said flanges having a latching pin element and a latching slot therein adapted to receive the pin element on the other flange to retain said side members in their erected positions, each of said flanges having detent means adjacent the corresponding slot and forming a detaining fit with the other pin element, whereby said pin elements can be snapped into said slots for retention therein against accidental disconnection, each of said side members including an end element projecting from the outer end thereof and extending beyond the other side member when said pin elements and slots are latched together, said end elements projecting away from the locations of said pin elements and slots and facilitating the overcoming of said detent means and the disconnection of said pin elements and slots by the application of a manually exerted squeezing force between said end elements on said side members.

2. A reflective marker according to claim 1, in which said base member includes a pair of additional detent elements on the opposite ends thereof for engaging and detaining said projecting end elements on said side members when said side members are moved to said folded positions.

3. A reflective marker according to claim 2, in which said additional detent elements take the form of resilient fingers engageable and displaceable by said end elements and having a detaining fit therewith.

4. A triangular folding reflective marker, comprising a reflective base member, first and second reflective side members having pivotal connections to opposite ends of said base member, said side members being swingable from horizontal folded positions adjacent said base member to inclined erected positions to form the sides of a triangle, and latching elements on the upper ends of said side members for holding said side members together in their erected positions, each of said side members including an end element extending beyond the other side member when said side members are latched together, said end elements projecting away from the locations of said latching elements and facilitating the disconnection of said latching elements on said side members by the application of a manually exerted squeezing force between said end elements.

5. A reflective marker according to claim 4, in which said base member includes a pair of additional detent elements on the opposite ends thereof for engaging and detaining said end elements on said side members when said side members are moved to said folded positions.

6. A reflective marker according to claim 5, in which said additional detent elements take the form of resilient fingers engageable and displaceable by said end elements.

* * * * *